(12) United States Patent
Weber (10) Patent No.: US 7,752,193 B2
(45) Date of Patent: Jul. 6, 2010

(54) SYSTEM AND METHOD FOR BUILDING AND RETRIEVING A FULL TEXT INDEX

(75) Inventor: Dominik Weber, El Sereno, CA (US)

(73) Assignee: Guidance Software, Inc., Pasadena, CA (US)

( * ) Notice: Subject to any disclaimer, the term of this patent is extended or adjusted under 35 U.S.C. 154(b) by 356 days.

(21) Appl. No.: 11/851,222

(22) Filed: Sep. 6, 2007

(65) Prior Publication Data

US 2008/0065607 A1 Mar. 13, 2008

Related U.S. Application Data

(60) Provisional application No. 60/843,443, filed on Sep. 8, 2006.

(51) Int. Cl.
*G06F 17/30* (2006.01)
*G06F 17/20* (2006.01)

(52) U.S. Cl. ............. 707/711; 707/742; 707/765; 704/1

(58) Field of Classification Search ............ 707/705, 707/711, 765
See application file for complete search history.

(56) References Cited

U.S. PATENT DOCUMENTS

| | | | | |
|---|---|---|---|---|
| 5,077,669 | A * | 12/1991 | Garneau et al. | 704/8 |
| 5,706,496 | A * | 1/1998 | Noguchi et al. | 1/1 |
| 5,778,361 | A * | 7/1998 | Nanjo et al. | 1/1 |
| 5,995,922 | A | 11/1999 | Penteroudakis et al. | |
| 6,466,901 | B1 * | 10/2002 | Loofbourrow et al. | 704/9 |
| 6,697,801 | B1 * | 2/2004 | Eldredge et al. | 1/1 |
| 2002/0010714 | A1 | 1/2002 | Hetherington | |
| 2003/0200199 | A1 * | 10/2003 | Snyder | 707/2 |
| 2004/0006455 | A1 * | 1/2004 | Fux et al. | 704/4 |
| 2006/0020585 | A1 | 1/2006 | Harvey et al. | |
| 2006/0173823 | A1 | 8/2006 | Zhu et al. | |
| 2006/0173886 | A1 * | 8/2006 | Moulinier et al. | 707/101 |
| 2007/0288448 | A1 * | 12/2007 | Datta | 707/5 |

OTHER PUBLICATIONS

Written Opinion and International Search Report for PCT/US2007/079924, dated Apr. 10, 2008, 8 pages.

* cited by examiner

*Primary Examiner*—John R. Cottingham
*Assistant Examiner*—James E Richardson
(74) *Attorney, Agent, or Firm*—Christie, Parker & Hale, LLP (57) ABSTRACT

An indexing engine generates a full text index of English and non-English files provided to the indexing engine. The indexing engine receives an input file for indexing, and normalizes the unique words contained in the input file. The normalizing includes stripping the words of any diacritical marks, taking into account different multilingual issues, case folding the words into lowercase, and the like. The normalized words are stored in a dictionary, and a word record is generated for each stored word. Each word record includes a flag that indicates whether one or more variations exist in the input file for the normalized word. One or more tables store information on the variations for the normalized words. When a query engine is invoked to search for an input query word, the variations are searched only if the user has set an option to consider such variations.

29 Claims, 8 Drawing Sheets

| | |
|---|---|
| Word Table | |
| File 0 Record | |
| ... | |
| File N Record | |
| ... | |
| File 0 Word Record 0 | |
| ... | |
| File N Word Record X | |
| Index Stream | |
| Offset Stream | |
| Text Stream | |
| Diacritical / Casing / Length Streams (Optional) | |

FIG. 9

SYSTEM AND METHOD FOR BUILDING AND RETRIEVING A FULL TEXT INDEX

CROSS-REFERENCE TO RELATED APPLICATION

This application claims the benefit of U.S. Provisional Application No. 60/843,443, filed on Sep. 8, 2006, the content of which is incorporated herein by reference.

BACKGROUND OF THE INVENTION

It is well known to generate indexes of files in order to efficiently search the content of those files. However, when the files contain non-English text and/or symbols, indexing and searching becomes more complicated. Accordingly, an efficient system and method is desired for building a full text index of files containing English text as well as non-English text, and which takes into account different script issues. The full text index should be structured in such a manner as to allow efficient and effective searching of the English and non-English text, including text containing diacritic symbols, special characters, and the like.

SUMMARY OF THE INVENTION

According to one embodiment, the present invention is directed to an indexing method that receives an input file for indexing. The input file includes a word having a diacritic symbol. Information on the diacritic symbol is stored in a first data structure, and the word is stripped of the diacritic symbol. The stripped word is stored in a second data structure. A query engine is configured to receive an input query word and search the second data structure for a match of the input query word.

According to one embodiment, the input query word includes the diacritic symbol, and the query engine is further configured to strip the input query word of the diacritic symbol, and search the second data structure for the stripped input query word.

According to one embodiment of the invention, the query engine is further configured to search the first data structure for a match of the diacritic symbol stripped from the input query word if the input query word is associated with a command to consider diacritics.

According to another embodiment, the present invention is directed to an indexing method that receives an input file for indexing, and normalizes a plurality of words contained in the input file. The plurality of normalized words are stored in a word table. A word record is generated for each of the plurality of normalized words in the word table. Each word record includes one or more flags for indicating whether one or more variations exist in the file for the normalized word. A query engine is configured to receive an input query word, normalize the input query word, and search the word table for the normalized input query word.

According to one embodiment, normalizing one of the plurality of words may include stripping the word of a diacritic symbol, or replacing a particular character of the word with a predefined character.

According to one embodiment of the invention, one or more tables storing information on the one or more variations for each of the normalized words are generated. The query engine is configured to search the one or more tables for information on the one or more variations matching the input query word responsive to a command to consider the one or more variations.

According to one embodiment of the invention, the variation of one of the normalized words includes a diacritic symbol, and the table stores information on the diacritic symbol. The variation of one of the normalized words may also include a casing variation.

According to another embodiment, the present invention is directed to a method for processing a search query for a query word. The method receives and normalizes an input query word. A word table storing a plurality of normalized words associated with a file is searched for the normalized input query word. Information on a word record for a normalized word matching the normalized input query word is retrieved from the word table. The word record includes a flag for indicating whether one or more variations exist in the file for the normalized word. The one or more variations are considered for a match against the input query word responsive to a command to consider the one or more variations.

According to one embodiment of the invention, the normalizing the query word includes stripping the query word of a diacritic symbol, or replacing a particular character with a predefined character.

According to one embodiment of the invention, one or more tables store information on the one or more variations of the normalized word. The one or more tables are searched for information on the one or more variations matching the input query word responsive to the command to consider the one or more variations.

According to another embodiment, the present invention is directed to an indexing system that includes an input file for indexing, and a indexing engine that normalizes a plurality of words contained in the input file. The system also includes a word table storing the plurality of normalized words, and a word record for each of the plurality of normalized words. Each word record includes a flag for indicating whether one or more variations exist in the input file for the normalized word. A query engine is configured to receive an input query word, normalize the input query word, and search the word table for the normalized input query word.

According to one embodiment of the invention, the system also includes one or more tables storing information on the one or more variations for each of the normalized words. The query engine is configured to search the one or more tables for information on the one or more variations matching the input query word responsive to a command to consider the one or more variations.

According to another embodiment, the present invention is directed to a system for processing a search query for a query word. The system includes a word table storing a plurality of normalized words associated with a file, and a word record for each normalized word stored in the word table. Each word record includes a flag for indicating whether one or more variations exist in the file for the normalized word. The system also includes a processor and a memory operably coupled to the processor which stores program instructions executed by the processor. The program instructions include receiving an input query word, normalizing the input query word, searching the word table for the normalized input query word, and retrieving from the word table information on the word record for the normalized word matching the normalized input query word. The one or more variations indicated in the retrieved word record are considered for a match against the input query word responsive to a command to consider the one or more variations.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, embodiments of the present invention are directed to an indexing engine which generates a full text index of English and non-English files provided to the engine. The indexing engine receives an input file for indexing, and normalizes the unique words contained in the input file. The normalizing includes stripping the words of any diacritical marks, taking into account different multilingual issues, case folding the words into lowercase, and the like. The normalized words are stored in a dictionary, and a word record is generated for each stored word. Each word record includes a flag that indicates whether one or more variations exist in the input file for the normalized word. One or more tables store information on the variations for the normalized words. When a query engine is invoked to search for an input query word, the variations are searched only if the user has set an option to consider such variations.

Figure 1:
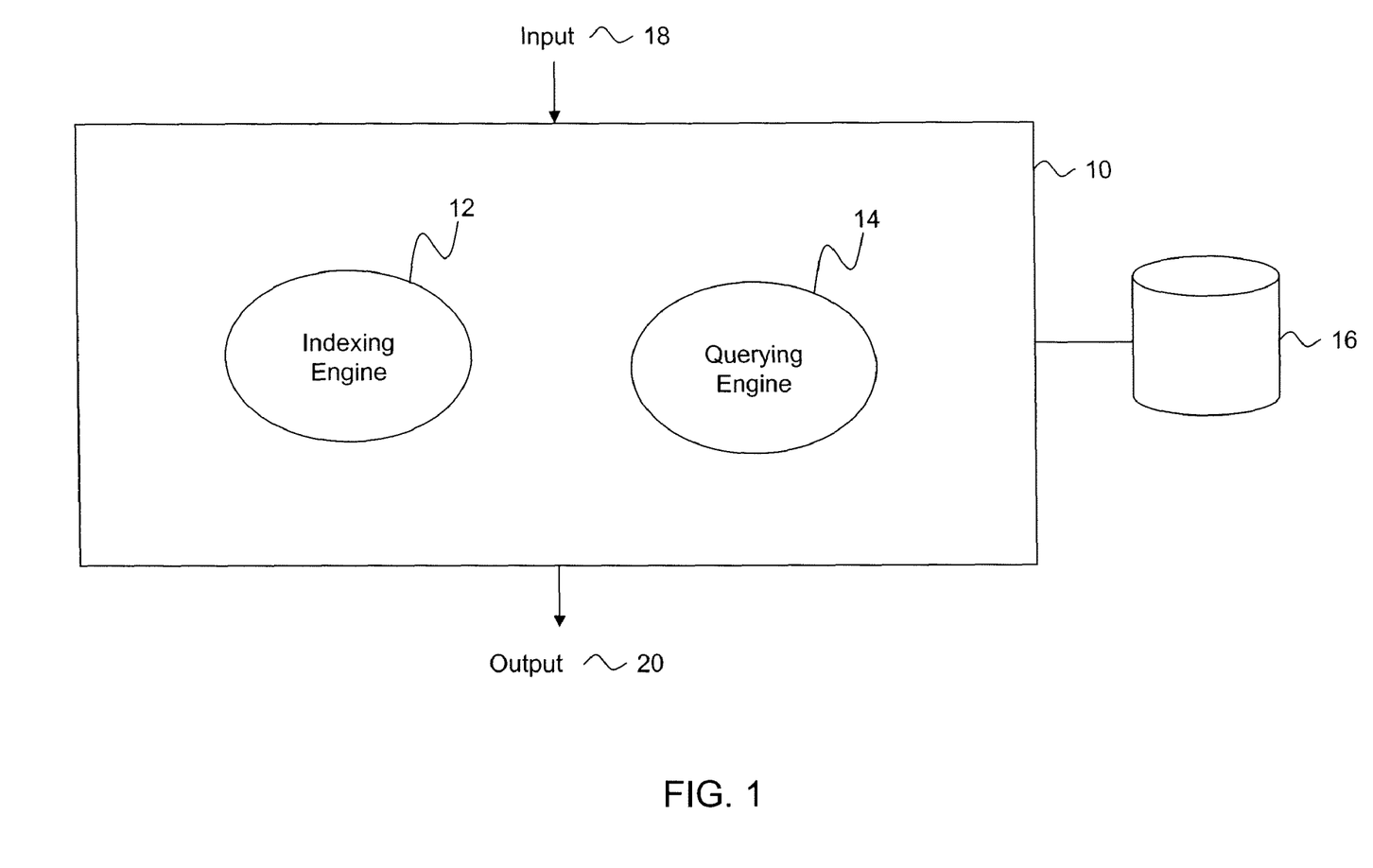
FIG. 1 is a block diagram of a computer device that includes an indexing engine and a querying engine.

FIG. 1 is a block diagram of a computer device 10 that includes an indexing engine 12 and a querying engine 14. The indexing engine 12 is configured to generate a full text index of English and non-English files provided to the indexing engine. Thus, instead of having a specialized indexing engine that is language specific, a generalized indexing engine is provided for indexing text of different languages and different scripts, while handling the differences introduced non-English words in an efficient manner.

The querying engine 14 is configured to search the full text index to locate one or more queried words in the indexed files. According to one embodiment of the invention, the querying engine 14 can locate text containing diacritical marks (also referred to as diacritics or diacritic symbols), special characters (e.g. sigma, eszett, etc.), scripts, and other symbols that are not common to the English language. According to one embodiment, diacritics are marks added to a letter or phoneme (e.g. an accent mark, tilde, etc.) to indicate a special phonetic value or to distinguish words that are otherwise graphically identical.

The computer device 10 may be any computer device known in the art that includes one or more processors and a memory. The indexing and querying engines 12, 14 may each be implemented via software stored as computer program instructions in the memory of the computer device 10. A person of skill in the art should recognize, however, that the indexing and querying engines 12, 14 may further reside in separate computer devices, and/or be implemented via software, firmware, hardware, or a combination of software, firmware, and hardware.

When used in the context of a forensic investigation system, such as, for example, the forensic investigation system described in U.S. Pat. No. 6,792,545, the content of which is incorporated herein by reference, both the indexing and the querying engines 12, 14 reside in an examining machine. Alternatively, the querying engine 14 resides in the examining machine while the indexing engine 12 resides in the target (investigated) machine. The indexing and/or querying engines 12, 14 may alternatively reside in a server accessible to the examining and/or target machines.

According to one embodiment of the invention, the computer device 10 receives an input 18 in the form of one or more files and one or more user commands invoking the functions of the indexing engine 12. The files and user commands need not be transmitted together, but may be transmitted separately, in which case the user commands include one or more identifiers of one or more files to be indexed. In this regard, the indexing engine 12 provides a graphical user interface (GUI) that allows a user to select the files to be indexed and to initiate the indexing function with respect to those files. The GUI may also allow the user to set a noise filter of the noise words that do not need indexing. A different noise filter may be set depending on the language of the file. The index that is generated is a single file storing indexing data in several internal streams. This index file is then stored in a mass storage device 16. An output 20 may then be generated to provide a status of the indexing function, the location of the generated index file, and the like.

According to another embodiment of the invention, the input 18 to the computer device 10 is a query of a particular text or phrase. The input may also set one or more query options, such as for example, an order option indicating that the order of the queried words matter, a diacritic option indicating that diacritic marks in the queried words are to be considered, a case option indicating that the query is case sensitive, and the like. A user may also perform a stemming search, wild card search, search by prefix, suffix, and the like. In this regard, the querying engine 14 provides a GUI for allowing the user to indicate the text or phrase to be queried along with any query options, and to initiate the querying function. The user may also select one or more files or one or more target machines to be queried.

Figure 2:
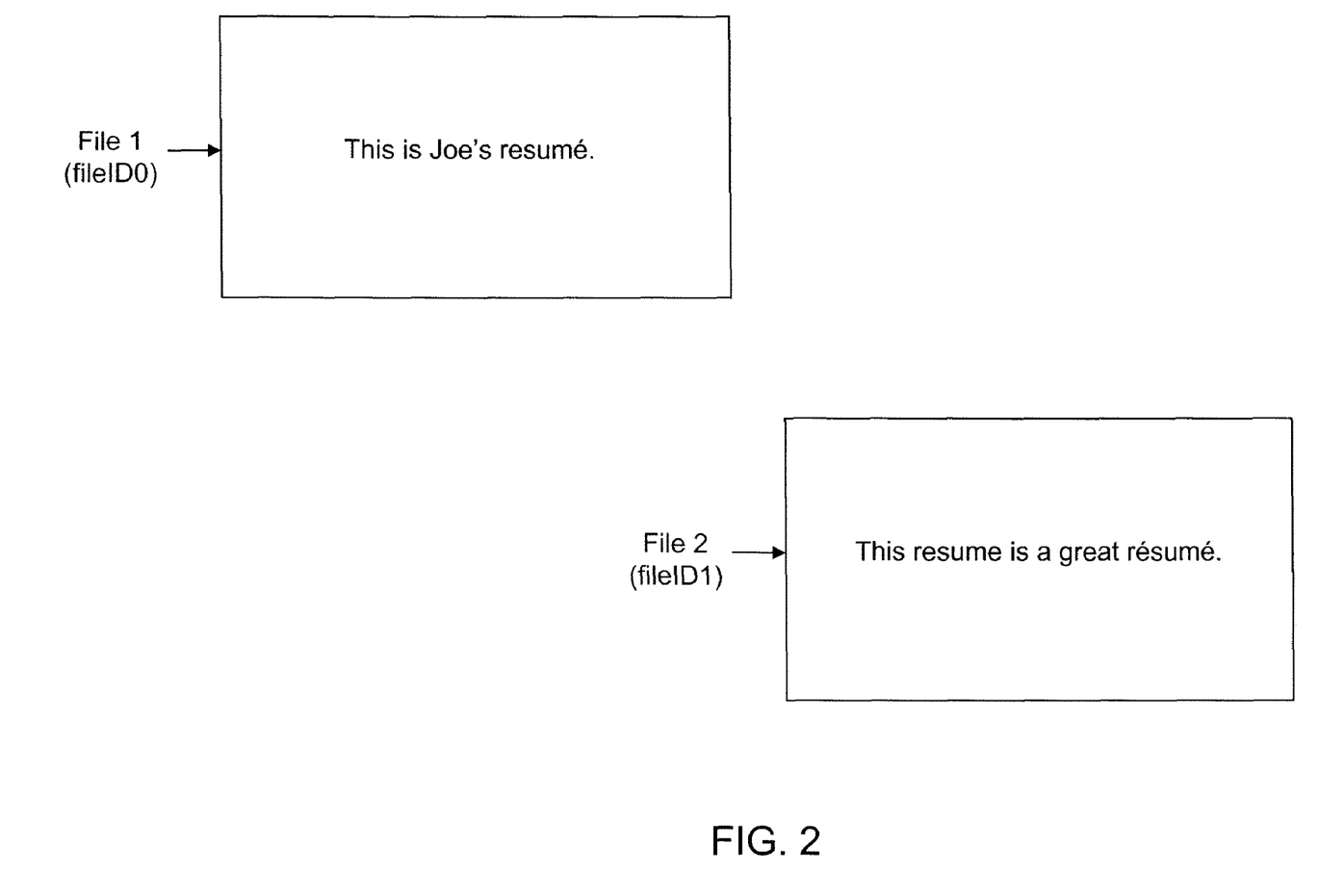
FIG. 2 illustrates two exemplary files that are provided to the indexing engine of FIG. 1 for indexing according to one embodiment of the invention.

FIG. 2 illustrates two exemplary files that are provided to the indexing engine 12 for indexing according to one embodiment of the invention. The indexing engine 12 provides a unique file ID to each file. In the illustrated example, file 1 is provided fileID 0 and file 2 is provided fileID 1.

The indexing engine 12 parses through each file, and, if the text in the files are not already in a particular coded symbol format that the indexing engine 12 wants, the indexing engine converts the text into the coded symbol format, such as, for example, unicode (UTF-16).

Figure 3A:
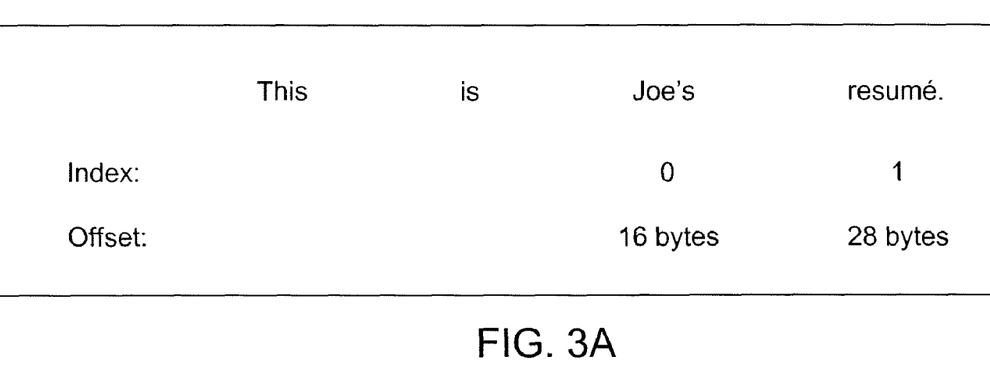
FIGS. 3A-3B illustrate word indices and byte offsets generated for each exemplary file of FIG. 2.
Figure 3B:
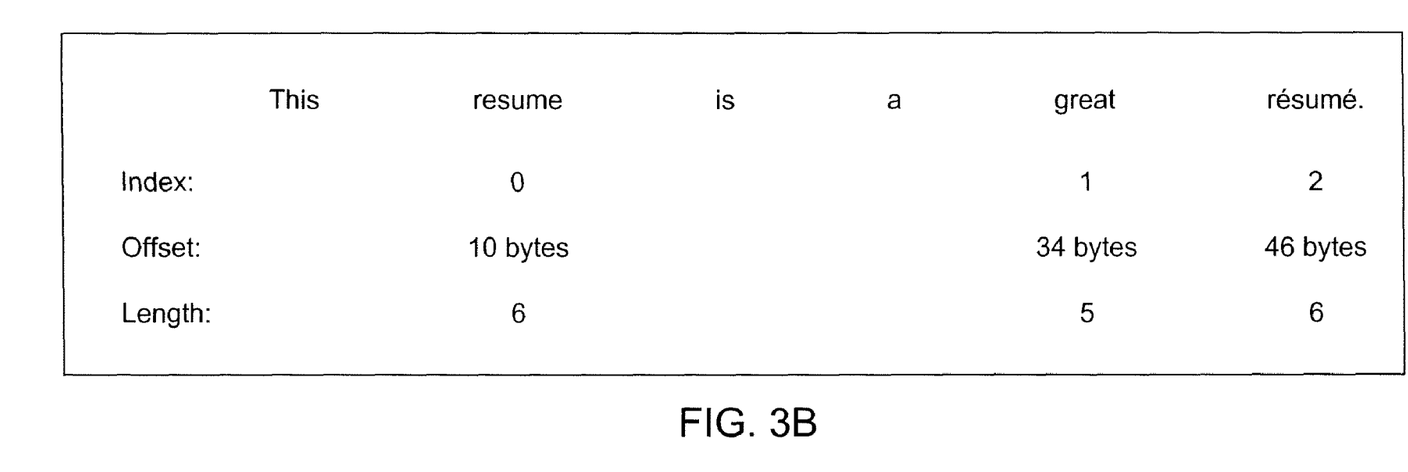

The indexing engine 12 further generates word indices and identifies byte offsets for the words in each file as is illustrated in FIGS. 3A-3B. Preferably, the indexed words are words that are not included in a noise filter list. A separate noise filter list may be generated for different languages, such as, for example, an English noise filter list, French noise filter list, and the like.

According to one embodiment of the invention, every unicode character (including spaces) consists of two bytes. The indices and byte offsets are then respectively stored in an index stream (FIG. 5A) and offset stream (FIG. 5B). According to one embodiment of the invention, the index stream groups the indexes by file and then by word.

In addition to the above, a text stream (FIG. 5C) may also be created which stores all the words of the indexed files on a per file basis.

The indexing engine 12 then engages in normalization of the non-noise words for generating a base representation of the words. According to one embodiment of the invention, the normalization process includes keeping the particular capitalizations of the words but stripping the words of any diacritical marks. Furthermore, the normalization process takes into account different multilingual issues. For example, German has a ß that is sometimes written with an "ss." As part of the normalization process, such non-English symbols are replaced with a predefined character that is appended with a private-use character (e.g. <U+E000>) that is treated as a diacritic. Thus, in the above example, ß is normalized to "ss+<U+E000>."

According to one embodiment of the invention, normalization further entails separating the diacritic symbol(s) from the other characters, case folding to lowercase (lowercasing), and the like.

After normalization, the indexing engine may optionally analyze the words to determine which scripts are used (e.g. Cyrillic, Latin, Han, Arabic, etc.). A script is a writing system for a language. Some languages can be written in one of two scripts. For example, English and modern Turkish can be written in Latin, and Russian in Cyrillic.

According to one embodiment of the invention, the indexing engine aggregates the statistics for the whole file with respect to identified script letters. The engine then maintains the top three identified scripts with their ratios and the top three Latin types with their ratios. For example, if the file contains 1 Latin letter and 1 Cyrillic letter, the file is deemed to be 50% Latin and 50% Cyrillic.

Also, if there is some Latin in a word, the engine tries to determine the sub-type (e.g. "German" Turkish, etc.) by looking at the statistics for the extended Latin letters (e.g. β, é, etc.). The information about the scripts contained in the files may then be used to find files that contain specific scripts, such as, for example, all Latin files.

Diacritical marks that have been separated out during the normalization process are stored in a separate diacritical stream. The diacritical stream contains a separate diacritical table for each file, indicating all the diacritic variations that occur in that file. FIG. 5D illustrates an exemplary diacritical stream including two diacritical tables 50a, 50b. The "mark" in each diacritical table references the particular diacritical mark (e.g. an accent mark), and the "delta" identifies a number of characters starting from a current position in which the mark appears. According to one embodiment of the invention, the actual mark is not stored in the diacritical table, but rather, an index to a table of diacritical marks for the file.

According to one embodiment, the diacritical table is generated according to the following rules:

1) A word with no diacritic symbols has an index of 0.

2) If a word has a diacritic variation that is not in the table, then add to the bottom of the table and give it a next diacritical index. Thus, the first entry of the diacritical table has the diacritical index 1. The index information for each diacritical table is also stored in the diacritical stream. In the illustrated example, table 50a is associated with diacritical index 1 as illustrated by reference 52a, and table 50b is associated with diacritical indices 0 and 1 as illustrated by reference 52b.

The indexing engine 12 further generates a word table (also referred to as a dictionary) (FIG. 4) containing the unique normalized words found in the files being indexed. The removal of diacritic symbols from the words before creating the word table prevent each diacritical variation of a word from being treated as a unique word, reducing the size of the word table and increasing query performance.

Figure 4:
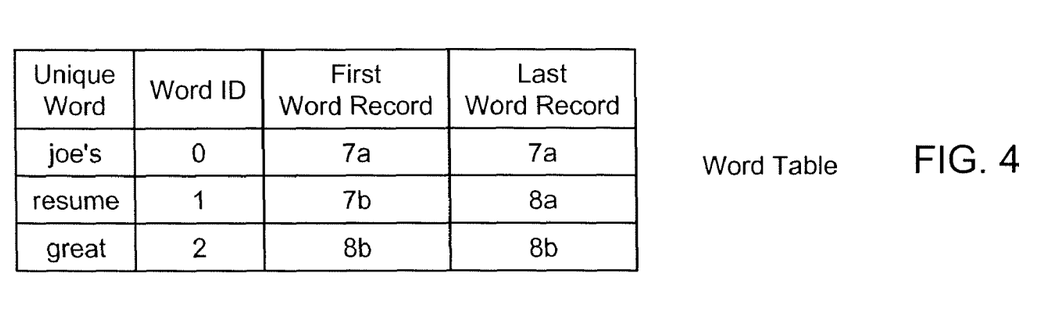
FIG. 4 is a layout illustration of an exemplary word table according to one embodiment of the invention.

Each unique word is assigned a word identifier as well as a location of a first word record associated with the word and a location of a last word record associated with the word. The first word record is accessed when a query is received for the associated word. The last word record is useful to modify information in that record when a new word record is added for the particular word.

According to one embodiment of the invention, a word record provides information about a word in a particular file which allows all hits of that word to be identified for that file. The word record also identifies a word record for the word in another file (if one such exists) as well as any diacritical information, length information, and casing information. Thus, for fileID 0, word records are generated for the words "Joe's" and "resume" at respectively word record positions 7a and 7b. For fileID 1, word records are generated for the words "resume" and "great" at respectively word record positions 8a and 8b.

Figure 6:
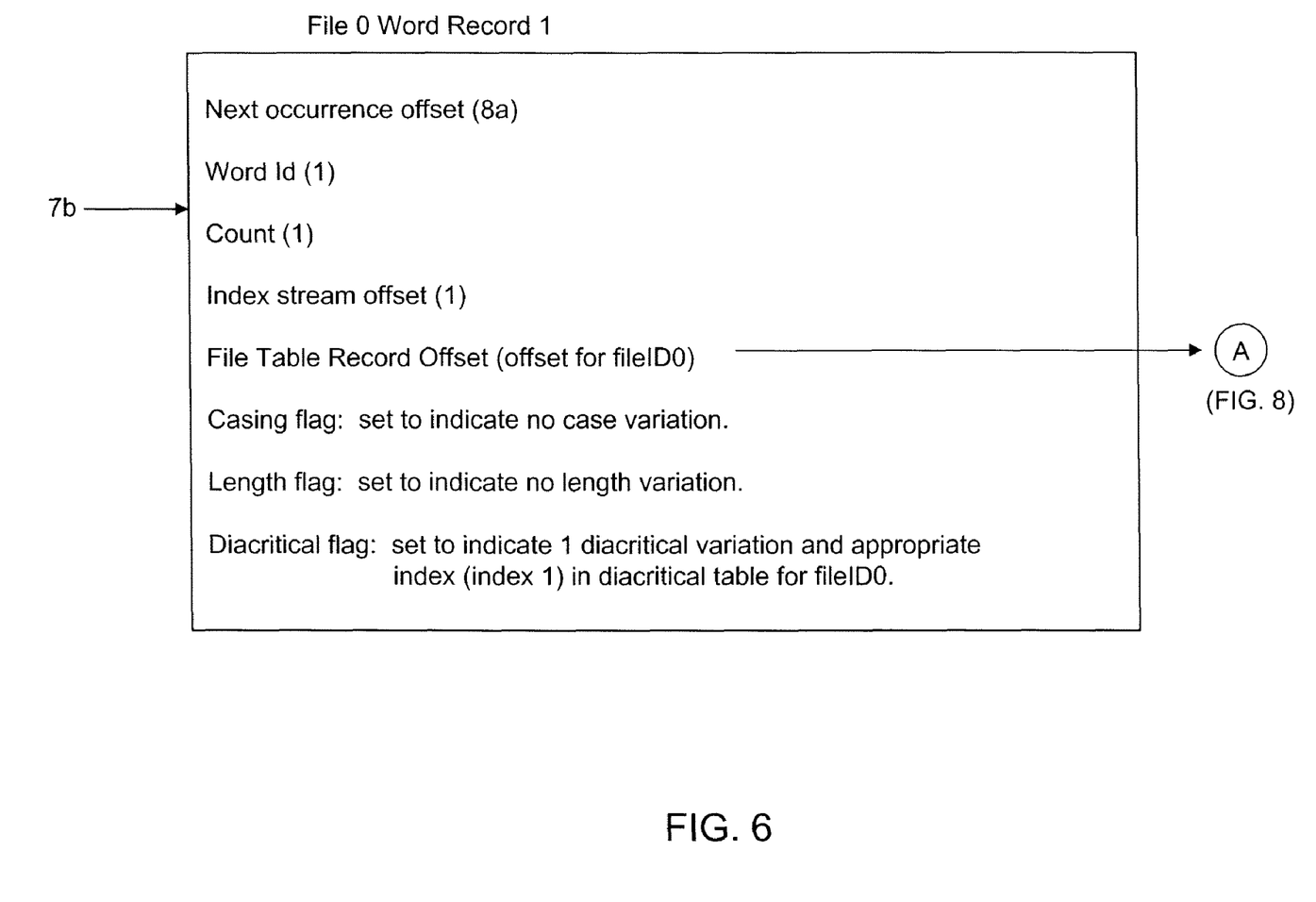
FIGS. 6-7 are layout illustrations of exemplary word records according to one embodiment of the invention.
Figure 7:
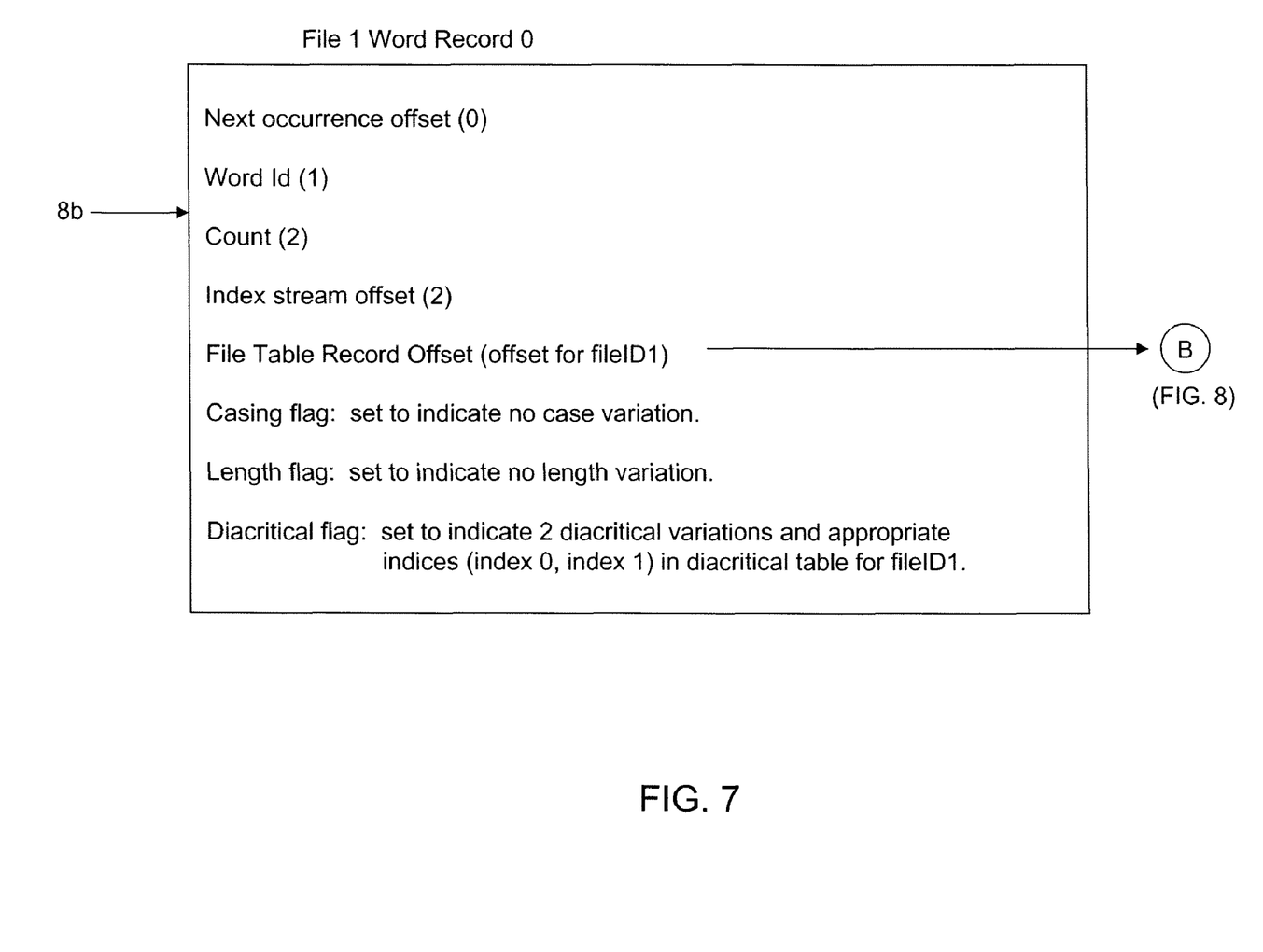

FIGS. 6 and 7 illustrate exemplary word records for respectively the word "resume" in fileID 0, and the word "resume" in fileID 1. Each word record includes a "next occurrence offset" providing the offset to a word record for the word in a next file if one such exists. A "wordID" identifies the word-identifier for the corresponding word in the word table. A "count" identifies the number of times the word occurs in the particular file. For example, the base form of the word "resume" occurs once in fileID 0, causing the "count" to be set to 1 in the example illustrated in FIG. 6. The base form of the word "resume" occurs twice in fileID 1, causing the "count" to be set to 2 in the example illustrated in FIG. 7.

Figure 5A:
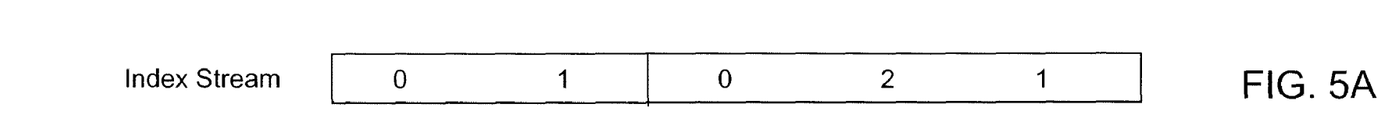
FIG. 5A is a layout illustration of an index stream according to one embodiment of the invention.
Figures 5B, 5C:
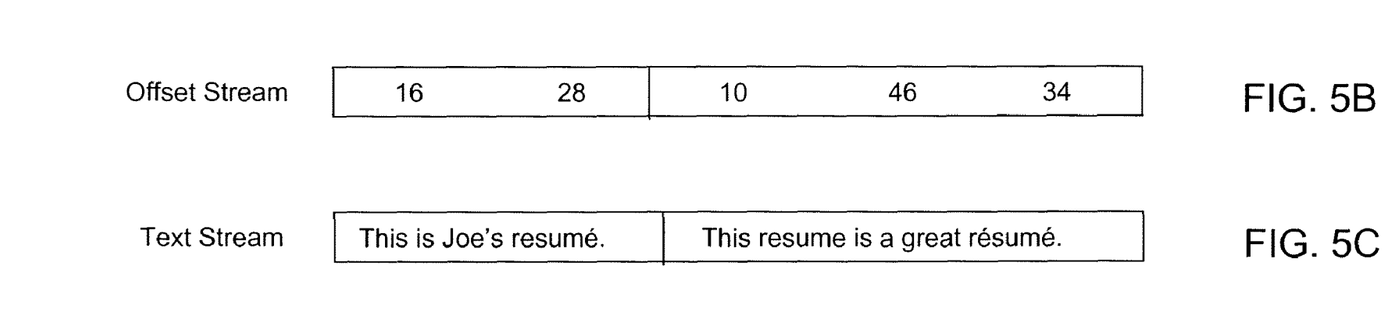
FIG. 5B is a layout illustration of an offset stream according to one embodiment of the invention.
FIG. 5C is a layout illustration of a text stream according to one embodiment of the invention.
Figure 5D:
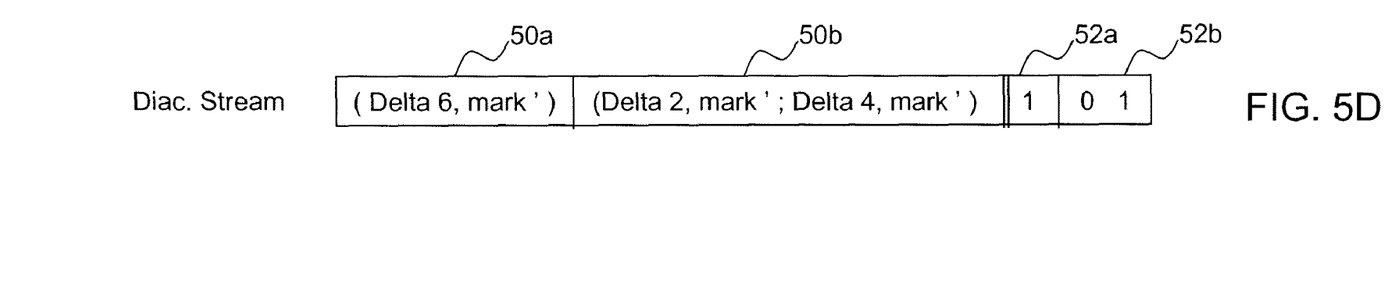
FIG. 5D is a layout illustration of a diacritical stream according to one embodiment of the invention.

Each word record further includes an "index stream offset" with an offset to the beginning of the appropriate set of word indices in the index stream (FIG. 5A). The index stream offset is 1 in the word record of FIG. 6 to locate the single word index for the word "resume" in fileID 0. The index stream offset is 2 in the word record of FIG. 7 to locate the beginning of the two word indices for the word "resume" in fileID 1.

Figure 8:
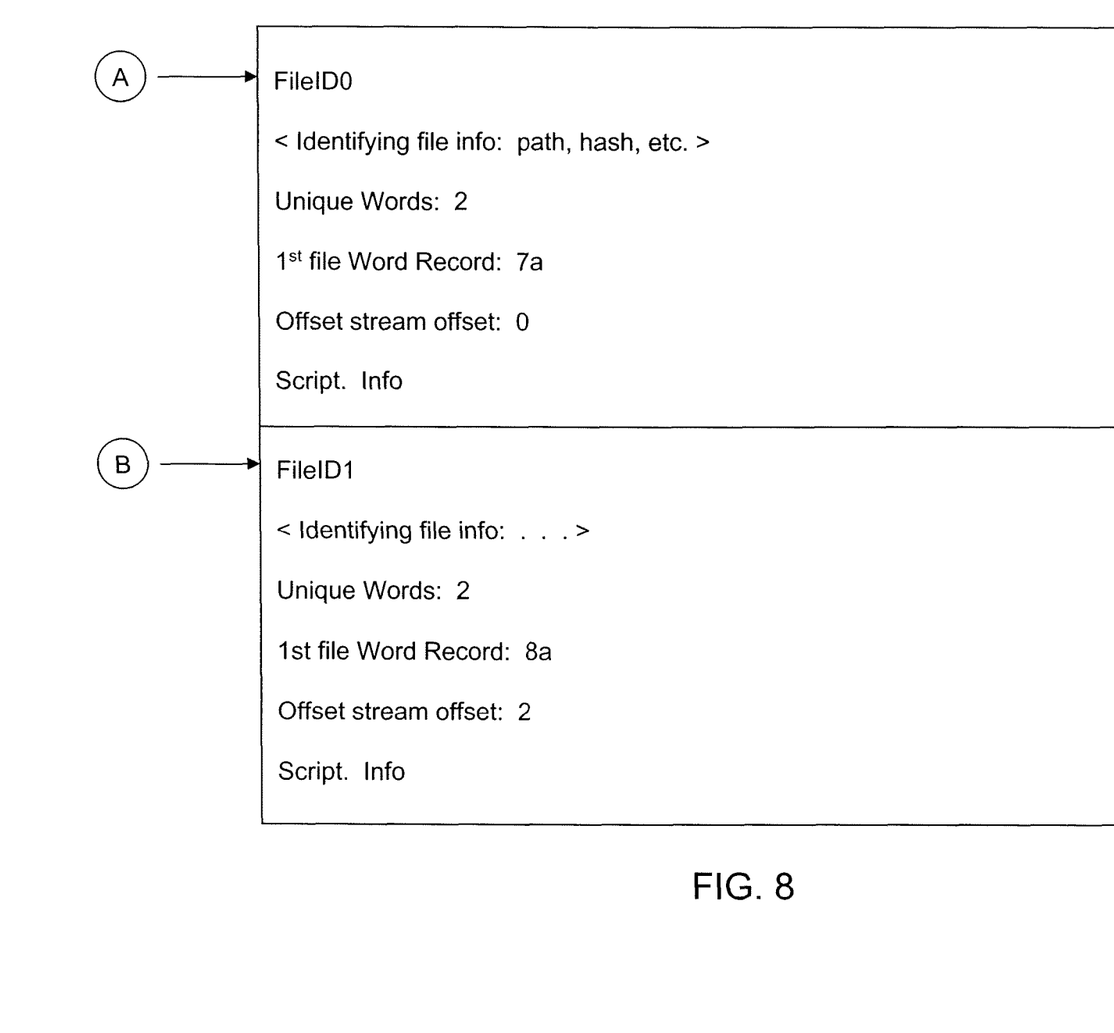
FIG. 8 is a layout illustration of a file record storing metadata information for a particular file according to one embodiment of the invention.

A "FileTableRecordOffset" included in each word record provides the starting location of the file record for each file, storing the metadata information for the file. FIG. 8 illustrates the metadata file records for fileID 0 and fileID 1. As illustrated there, each file record provides identifying file information such as, for example, file path, file hash value, and the like. The file record also provides the number of unique words in the file, the first word record for the file, and an offset to the offset stream (FIG. 5B) storing offsets for the words in the actual file. Each file record may also provide the top three identified scripts with their ratios, and the top three Latin types with their ratios. A 0 is entered if none is found/detected.

Referring again to the word records of FIGS. 6 and 7, each word record also stores casing information, length information, and diacritical information for the corresponding word in the corresponding file. The casing, length, and diacritical information respectively indicate a number of case, length, and diacritical variations of the word in the file. If variations exist, corresponding offsets in respectively a casing stream (not shown), length stream (not shown), and diacritical stream (FIG. 5D) are provided for respectively obtaining a casing table, length table, and diacritical table that contains information on the particular variation.

For example, a diacritical flag is set in the word record of FIG. 6 to indicate one diacritical variation in fileID 0 to account for the accented word "resumé" in this file. The word record includes an offset to the diacritical table for fileID 0, as well as the offset to the appropriate index (index 1) in this diacritical table. The stored diacritical information indicates an accent on the 6th character from a current location (i.e. the last "e" of the word resume).

The diacritical flag of the word record of FIG. 7 is set to indicate two diacritical variations in fileID 1 to account for the words "resume" and "résumé." According to one embodiment of the invention, the accent free variation of the word "resume" gets the diacritical index 0, and needs no entry in the diacritical table. The word corresponding to word index 2 in fileID 1 has its diacritical information stored in index 1 of the diacritical table, and indicates an accent on the 2nd character from a current location, and the 4th character from a current location (i.e. the first and last "e" of the word resume). The appropriate index information is obtained via an offset to the diacritical stream stored in the word record.

Length variations may also exist where a variation of the normalized word has a length different than the normalized word. If so, the length variation information is provided in the corresponding word record and indices to a length table containing the different length information for the particular word is provided. For example, the last "e" of "resumé" could be encoded as "é" or as e+accent. Thus, the word lengths could respectively be 6 or 7. Also ligatures like "fi" may be represented as one or two characters. The length variation information is useful to highlight the results of a query in the source document.

A casing variation exists when the there is one or more characters of the normalized word which casing is different from the normalized word.

Figure 9:
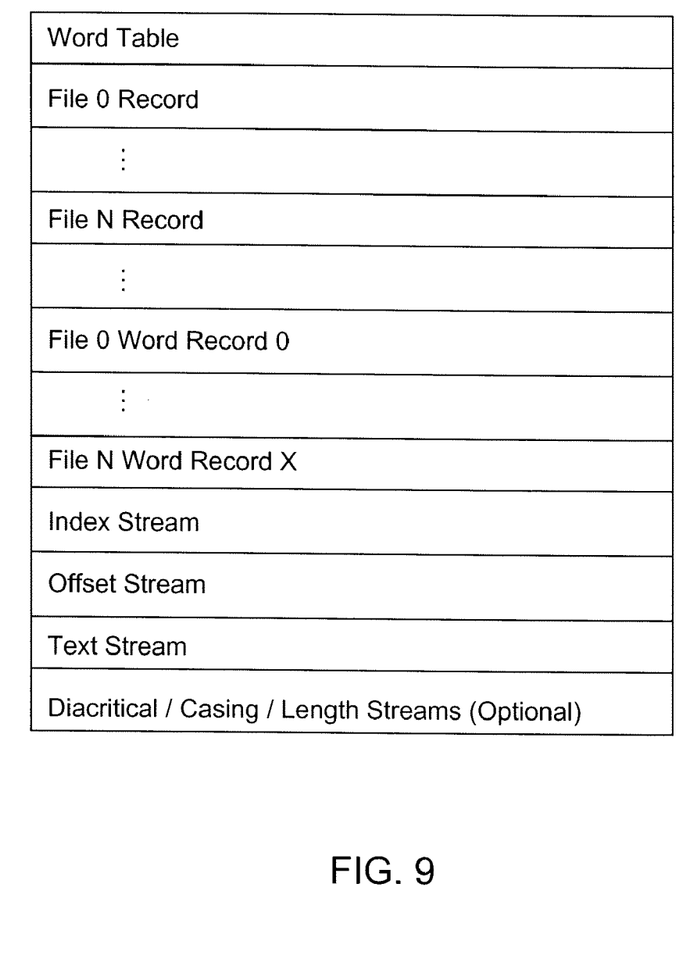
FIG. 9 is a layout illustration of an exemplary index file according to one embodiment of the invention.

According to one embodiment of the invention, the generated word table (FIG. 4), file records (FIG. 8) word records (FIGS. 6-7), index stream (FIG. 5A), offset stream (FIG. 5B), text stream (FIG. 5C), and any diacritical stream (FIG. 5D), length stream, or casing stream are included in a single index file. An exemplary index file is illustrated in FIG. 9.

The generated index file is then used by the querying engine 14 for finding matches of queried words in the indexed files. A queried word or phrase may be entered with various querying options. Selecting an "ordered" option sets a flag that indicates that the words must appear in the order of the phrase. Selecting a "case" option sets a flag indicating that the query is case sensitive. Selecting a "diacritic" option sets a flag indicating that a hit must match the diacritic variation of the queried word. Selecting a "grep" option sets a flag indicating wildcards. Selecting a "umlaut" option selects a flag indicating that the German umlaute (Ä, Ö, Ü, ä, ö, ü) may be written with an "e" instead of the dieresis (e.g. Dübel may be written as Duebel). Thus, a file containing Duebel may be considered a hit for a query for Dübel if the umlaut option has been set.

Selecting a "stemming" option modifies a word grammatically to make variations based on a main part of a word. For example, if an input query word is "are," and the stemming option has been set, the words "are," "be," "been," "being," "am," "is," "was," and "were" may all deem to be hits.

For purposes of illustration, a query of the word "Resumé" is described with reference to FIGS. 2-9. It is assumed that neither the "case," option nor the "diacritic" option have been set for this query.

Upon receipt of the query request, the querying engine 14 normalizes the word "Resumé" by stripping out the diacritic symbol and lowercasing the word. A lookup of the normalized word "resume" in the word table (FIG. 4) yields a word ID "1" and the first word record position "7b."

The querying engine 14 loads the word record in position "7b" (FIG. 6) and loads the corresponding file record (FIG. 8) based on the "FileTableRecordoffset." The retrieved file record indicates that the file being considered is fileID 0. The "count" information indicates only 1 hit in the file. The word index of the single hit in that file is retrieved based on the "index stream offset." In the illustrated example, a hit occurs for word index 1 (index stream offset 1). This word occurs at byte 28, and is assumed to have the original length of 6 given that the length flag does not indicate any length variations. Thus, 6 characters may be highlighted in fileID 0 starting from byte 28, in order to indicate a hit.

The casing and diacritic symbols are ignored for purposes of this example query. However, if the casing is to be taken into account, the casing information is retrieved from the word record. Since the casing flag in the word record of FIG. 6 is set to indicate no case variation, and given that the queried word has an uppercase "R," a no hit is returned. According to one embodiment, a casing table has bits for every character that can change its case. The bit that corresponds to the particular character which casing is different from the normalized word, is set.

On the other hand, if the diacritics is to be taken into account while casing is ignored, the corresponding diacritical table 50a is retrieved from the diacritical stream (FIG. 5D) and the first entry of the table (Delta 6, mark ') is compared against the diacritical information of the queried word (Delta 6, mark '). Because the diacritical information in the table 50a matches the diacritical information of the queried word, a hit is returned.

The querying engine 14 next examines the "next occurrence offset" in the word record to obtain the offset to a word record for "resume" in the next file. The "next occurrence offset" in the word record of FIG. 6 indicates a next word record in position 8a. This word record is then loaded (FIG. 7) and the corresponding file record is also loaded based on the "FileTableRecordOffset." The retrieved file record indicates that the file being considered is fileID 1. The "count" information indicates two hits in the file. The beginning of the corresponding word index set is retrieved based on the "index stream offset." In the illustrated example, two consecutive indices are retrieved based on this offset, i.e. word index 0 and at word index 2, given that the "count" information indicates two hits. Word index 0 occurs at byte 10, and is assumed to have the original length of 6 given that the length flag does not indicate any length variations. Word index 2 occurs at byte 46, and is also assumed to have the original length. Thus, 6 characters may be highlighted in fileID 1 starting from byte 10, in order to indicate a first hit, and another 6 characters may be highlighted starting from byte 46 in order to indicate a second hit.

Again, if the diacritics is to be taken into account, the diacritical table 50b stored for this file is reviewed for determining a match. The diacritical information in the word record of FIG. 7 indicates that the first potential hit has no diacritic variation given the index 0 in the diacritical table 50b. Thus, a no match is declared.

The second potential hit has a diacritical variation stored in index 1 of the diacritical table 50b for fileID 1. The diacritical information in this index (Delta 2, mark '; delta 4, mark ') is compared against the diacritical information of the queried word (Delta 6, mark '). Again, the diacritical information does not match, and a no match is declared.

The querying engine 14 next examines the "next occurrence offset" in the current word record. Because the next occurrence offset is 0, there are no more files containing the queried word and the process ends.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. An indexing method comprising:
    receiving an input file for indexing, the input file including a word including a diacritic symbol, the diacritic symbol being a mark added to a character;
    storing information on the diacritic symbol in a first data structure, wherein the information includes a numeric value indicative of a position of the diacritic symbol in the word, and a representation of the diacritic symbol;
    stripping the word of the diacritic symbol; and
    storing the stripped word in a second data structure,
    wherein, a query engine is configured to receive an input query word and search the second data structure for an indexed word matching the input query word, wherein in response to a command to consider diacritic symbols, the query engine is further configured to retrieve the information on the diacritic symbol corresponding to the matched indexed word from the first data structure, and compare the retrieved information against information of a diacritic symbol in the input query word for determining a match.

2. The method of claim 1, wherein the input query word includes the diacritic symbol, and the query engine is further configured to:
    strip the input query word of the diacritic symbol; and
    search the second data structure for the stripped input query word.

3. The method of claim 2, wherein the query engine is further configured to:
    search the first data structure for a match of the diacritic symbol stripped from the input query word if the input query word is associated with a command to consider diacritics.

4. The method of claim 2, wherein the query engine is configured to receive a command to consider diacritics in the input query word, the method further comprising:
    storing second information on the diacritic symbol stripped from the input query word, wherein the second information includes a second numeric value indicative of a position of the diacritic symbol in the input query word, and a representation of the diacritic symbol,
    wherein, in response to the command, the query engine is configured to search the first data structure for information on the diacritic symbol for an indexed word corresponding to the stripped input query word, compare the information on the diacritic symbol with the second information on the diacritic symbol stripped from the input query word, and return a no match in response to a no match of the compared information.

5. The method of claim 1, wherein the representation is a mark representing the diacritic symbol.

6. The method of claim 1, wherein the representation is an index to a table storing a mark representing the diacritic symbol.

7. The method of claim 1, wherein the first data structure stores the information on the diacritic symbol separately from the word.

8. An indexing method comprising:
    receiving an input file for indexing, the input file including a plurality of words, at least one of the plurality of words including a diacritic symbol, the diacritic symbol being a mark added to a character;
    storing information on the diacritic symbol in a first data structure, wherein the information includes a numeric value indicative of a position of the diacritic symbol in the word, and a representation of the diacritic symbol;
    normalizing the plurality of words contained in the input file;
    storing the plurality of normalized words in a word table;
    generating a word record for each of the plurality of normalized words in the word table, each word record including one or more flags for indicating whether one or more variations exist in the file for the normalized word,
    wherein, a query engine is configured to receive an input query word, normalize the input query word, and search the word table for a match of the normalized input query word with a stored normalized word, wherein in response to a command to consider diacritic symbols, the query engine is further configured to retrieve the information on the diacritic symbol corresponding to the matched normalized word from the first data structure, and compare the retrieved information against information of a diacritic symbol in the input query word for determining a match.

9. The method of claim 8, wherein normalizing one of the plurality of words includes stripping the word of a diacritic symbol.

10. The method of claim 8, wherein normalizing one of the plurality of words includes replacing a particular character of the word with a predefined character.

11. The method of claim 8 further comprising:
    generating one or more tables storing information on the one or more variations for each of the normalized words,
    wherein, the query engine is configured to search the one or more tables for information on the one or more variations matching the input query word responsive to a command to consider the one or more variations.

12. The method of claim 11, wherein the variation of one of the normalized words includes a diacritic symbol, and the table stores information on the diacritic symbol.

13. The method of claim 11, wherein the variation of one of the normalized words includes a casing variation.

14. A method for processing a search query for a query word, the method comprising:
    receiving an input query word;
    normalizing the input query word;
    searching a word table for the normalized input query word, the word table storing a plurality of normalized words associated with a file;
    retrieving from the word table information on a word record for a normalized word matching the normalized input query word, the word record including a flag for indicating whether one or more variations exist in the file for the normalized word, wherein in response to a command to consider diacritic symbols, information on a diacritic symbol corresponding to the matched normalized word is retrieved from a first data store and compared against information of a diacritic symbol in the input query word for determining a match, wherein the information on the diacritic symbol stored in the first data structure includes a numeric value indicative of a position of the diacritic symbol in the word prior to normalizing, and a representation of the diacritic symbol, the diacritic symbol being a mark added to a character.

15. The method of claim 14, wherein normalizing the query word includes stripping the query word of a diacritic symbol.

16. The method of claim 14, wherein normalizing the query word includes replacing a particular character with a predefined character.

17. The method of claim 14, wherein one or more tables store information on the one or more variations of the normalized word, the method further comprising:
searching the one or more tables for information on the one or more variations matching the input query word responsive to the command to consider the one or more variations.

18. The method of claim 17, wherein one the variations of the normalized word includes a diacritic symbol, and the table stores information on the diacritic symbol.

19. The method of claim 17, wherein one of the variations of the normalized word is a casing variation.

20. An indexing system comprising:
an input device configured to receive an input file for indexing;
a processor configured to normalize a plurality of words contained in the input file, at least one of the plurality of words including a diacritic symbol, the diacritic symbol being a mark added to a character;
at least one data storage device storing:
a word table storing the plurality of normalized words;
a diacritical table storing information on the diacritic symbol included in the at least one of the plurality of words, the information including a numeric value indicative of a position of the diacritic symbol in the word, and a representation of the diacritic symbol; and
a word record for each of the plurality of normalized words, each word record including a flag for indicating whether one or more variations exist in the input file for the normalized word,
wherein, a query engine is configured to receive an input query word, normalize the input query word, and search the word table for a match of the normalized input query word with a stored normalized word, wherein in response to a command to consider diacritic symbols, the query engine is further configured to retrieve the information on the diacritic symbol corresponding to the matched normalized word from the first data structure, and compare the retrieved information against information of a diacritic symbol in the input query word for determining a match.

21. The system of claim 20, wherein the means for normalizing one of the plurality of words includes stripping the word of a diacritic symbol.

22. The system of claim 20, wherein the means for normalizing one of the plurality of words includes replacing a particular character of the word with a predefined character.

23. The system of claim 20, wherein the data storage device further stores one or more tables storing information on the one or more variations for each of the normalized words, wherein, the query engine is configured to search the one or more tables for information on the one or more variations matching the input query word responsive to a command to consider the one or more variations.

24. The system of claim 20, wherein the flag indicates the variation as being inclusion of a diacritic symbol.

25. The system of claim 20, wherein the one or more variations for the normalized word includes a casing variation.

26. A system for processing a search query for a query word, the system comprising:
at least one storage device storing a word table storing a plurality of normalized words associated with a file, and a word record for each normalized word stored in the word table, each word record including a flag for indicating whether one or more variations exist in the file for the normalized word;
a processor; and
a memory operably coupled to the processor and storing program instructions therein, the processor being operable to execute the program instructions, the program instructions including:
receiving an input query word;
normalizing the input query word;
searching the word table for the normalized input query word; and
retrieving from the word table information on the word record for the normalized word matching the normalized input query word, wherein the one or more variations indicated in the retrieved word record are considered for a match against the query word responsive to a command to consider the one or more variations, wherein in response to a command to consider diacritic symbols, information on a diacritic symbol corresponding to the matched normalized word is retrieved from a first data store and compared against information of a diacritic symbol in the input query word for determining a match, wherein the information on the diacritic symbol stored in the first data structure includes a numeric value indicative of a position of the diacritic symbol in the word prior to normalizing, and a representation of the diacritic symbol, the diacritic symbol being a mark added to a character.

27. The system of claim 26, wherein the normalizing the query word includes stripping the word of a diacritic symbol.

28. The system of claim 26 further comprising:
one or more tables storing information on the one or more variations indicated in the retrieved word record, wherein the program instructions further include searching the one or more tables for information on the one or more variations matching the input query word responsive to the command to consider the one or more variations.

29. The system of claim 28, wherein one of the variations indicated in the retrieved word record is inclusion of a diacritic symbol, and the table stores information on the diacritic symbol.

* * * * *